United States Patent
Martin

(10) Patent No.: US 10,367,315 B1
(45) Date of Patent: Jul. 30, 2019

(54) CHAIR MOLDING WITH INTEGRATED ELECTRICAL OUTLETS

(71) Applicant: Marie Martin, Orlando, FL (US)

(72) Inventor: Marie Martin, Orlando, FL (US)

(*) Notice: Subject to any disclaimer, the term of this patent is extended or adjusted under 35 U.S.C. 154(b) by 0 days.

(21) Appl. No.: 15/985,805

(22) Filed: May 22, 2018

(51) Int. Cl.
| | |
|---|---|
| *H01R 25/00* | (2006.01) |
| *H01R 25/14* | (2006.01) |
| *H01R 24/78* | (2011.01) |
| *H01R 25/16* | (2006.01) |
| *H01R 31/02* | (2006.01) |
| *H01R 31/06* | (2006.01) |

(52) U.S. Cl.
CPC ........... *H01R 25/142* (2013.01); *H01R 24/78* (2013.01); *H01R 25/006* (2013.01); *H01R 25/00* (2013.01); *H01R 25/003* (2013.01); *H01R 25/14* (2013.01); *H01R 25/145* (2013.01); *H01R 25/16* (2013.01); *H01R 25/164* (2013.01); *H01R 25/165* (2013.01); *H01R 31/02* (2013.01); *H01R 31/06* (2013.01)

(58) Field of Classification Search
CPC ........ H01R 25/16; H01R 31/02; H01R 25/14; H01R 25/00; H01R 25/003; H01R 25/164; H01R 25/165; H01R 25/142; H01R 25/145; H01R 31/06
USPC ................ 439/215, 120, 216, 214, 209, 652
See application file for complete search history.

(56) References Cited

U.S. PATENT DOCUMENTS

| | | | |
|---|---|---|---|
| 2,283,398 A | 5/1942 | Deventer | |
| 3,012,217 A | 12/1961 | Luis | |
| 3,171,702 A * | 3/1965 | Schumacher | H02G 3/128 174/101 |
| 3,262,083 A * | 7/1966 | Gooding | E04F 19/04 174/101 |
| 4,646,211 A | 2/1987 | Gallant | |
| 4,875,871 A * | 10/1989 | Booty, Sr. | H01R 25/162 439/209 |
| D355,161 S | 2/1995 | Bodnar | |
| 6,216,406 B1 | 4/2001 | Hauser | |
| 6,644,988 B2 | 11/2003 | Healy | |
| 7,128,585 B2 | 10/2006 | Evilsizer | |
| 7,374,444 B1 | 5/2008 | Bennett | |

FOREIGN PATENT DOCUMENTS

WO 2005086295 9/2005

* cited by examiner

*Primary Examiner* — Abdullah A Riyami
*Assistant Examiner* — Justin M Kratt
(74) *Attorney, Agent, or Firm* — Kyle A. Fletcher, Esq.

(57) ABSTRACT

The chair molding with integrated electrical outlets is a dabo molding. The chair molding with integrated electrical outlets is configured for use with a vertical surface. The chair molding with integrated electrical outlets mounts on the vertical surface. The chair molding with integrated electrical outlets comprises a molding, a plurality of electrical ports, and an NEG cable. The molding attaches to the vertical surface. The molding contains the plurality of electrical ports. The NEG cable attaches the plurality of electrical ports to an external power source. In the first potential embodiment of the disclosure, the external power source is a national electric grid.

14 Claims, 3 Drawing Sheets

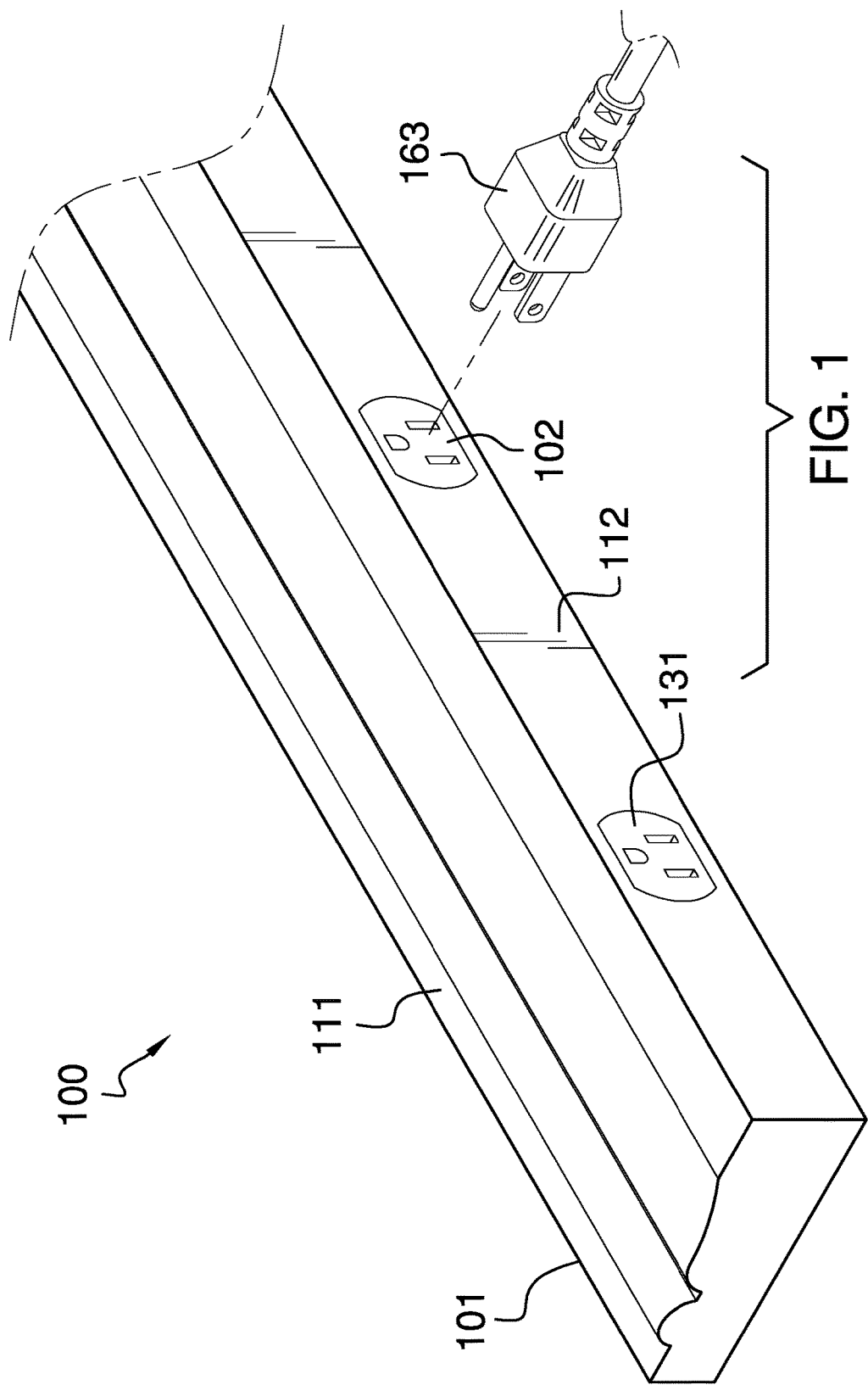

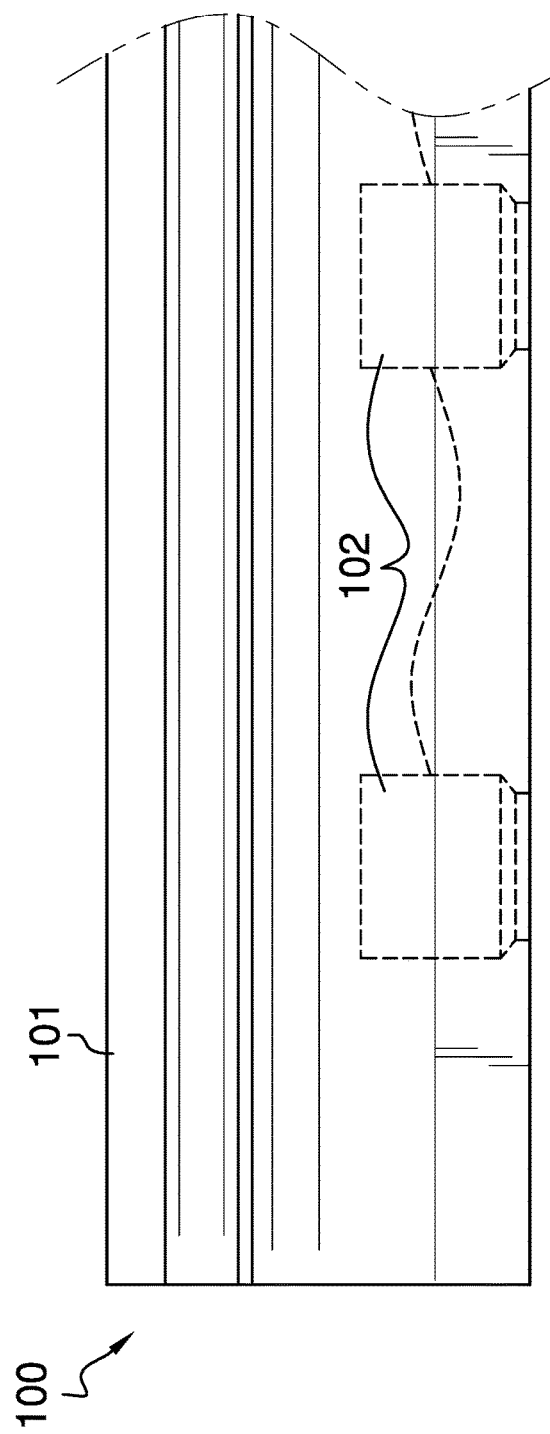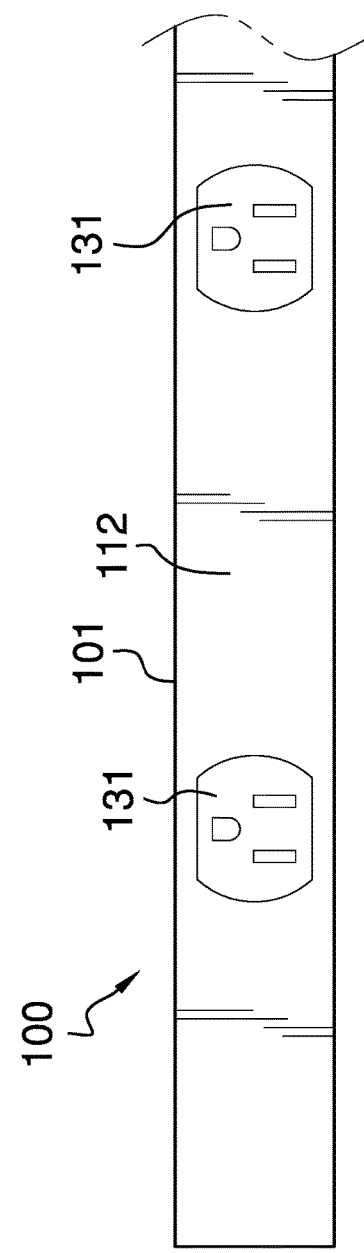

CHAIR MOLDING WITH INTEGRATED ELECTRICAL OUTLETS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electricity including the installation of electrical cables, more specifically, a detail regarding the installation of electrical distribution cables in a building.

SUMMARY OF INVENTION

The chair molding with integrated electrical outlets is a dabo molding. The chair molding with integrated electrical outlets is configured for use with a vertical surface. The chair molding with integrated electrical outlets mounts on the vertical surface. The chair molding with integrated electrical outlets comprises a molding, a plurality of electrical ports, and an national electric grid (hereinafter NEG cable). The molding attaches to the vertical surface. The molding contains the plurality of electrical ports. The NEG cable attaches the plurality of electrical ports to an external power source. In the first potential embodiment of the disclosure, the external power source is a national electric grid.

These together with additional objects, features and advantages of the chair molding with integrated electrical outlets will be readily apparent to those of ordinary skill in the art upon reading the following detailed description of the presently preferred, but nonetheless illustrative, embodiments when taken in conjunction with the accompanying drawings.

In this respect, before explaining the current embodiments of the chair molding with integrated electrical outlets in detail, it is to be understood that the chair molding with integrated electrical outlets is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the chair molding with integrated electrical outlets.

It is therefore important that the claims be regarded as including such equivalent construction insofar as they do not depart from the spirit and scope of the chair molding with integrated electrical outlets. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 1 is a perspective view of an embodiment of the disclosure.

FIG. 2 is a front view of an embodiment of the disclosure.

FIG. 3 is a bottom view of an embodiment of the disclosure.

DETAILED DESCRIPTION OF THE EMBODIMENT

Figure 4:
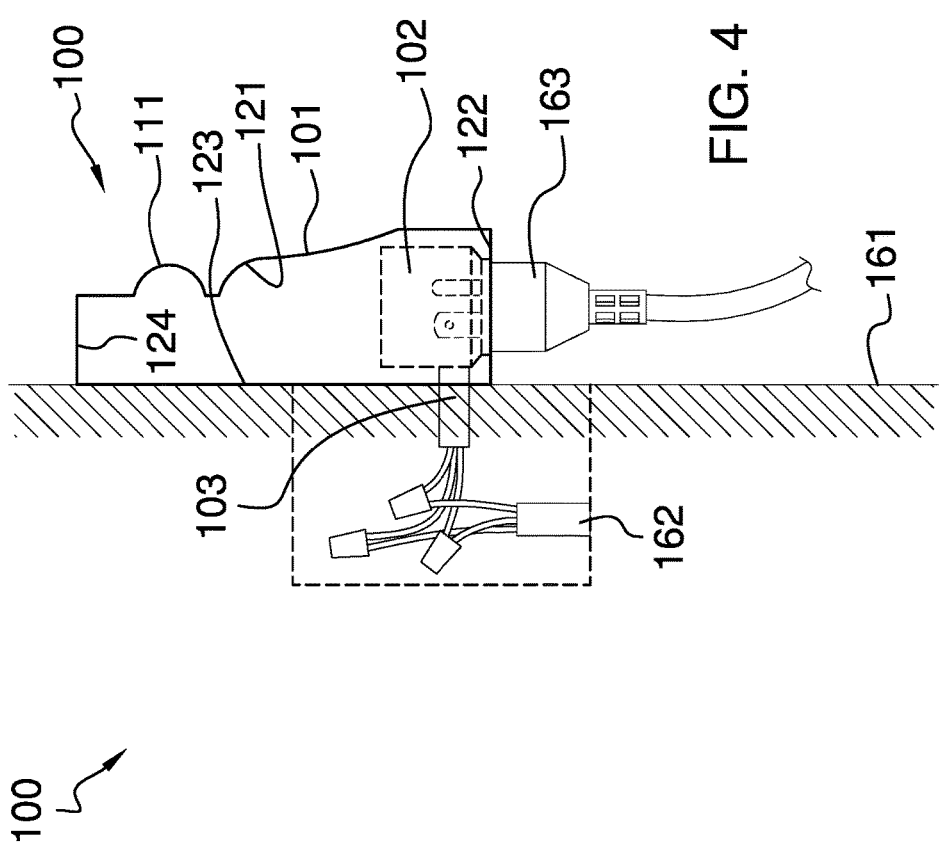
FIG. 4 is an in-use view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 4.

The chair molding with integrated electrical outlets 100 (hereinafter invention) is a dabo molding 101. The invention 100 is configured for use with a vertical surface 161. The invention 100 mounts on the vertical surface 161. This disclosure assumes that the vertical surface 161 is a wall formed within an interior chamber of a building. The invention 100 comprises a molding 101, a plurality of electrical ports 102, and an NEG cable 103. The molding 101 attaches to the vertical surface 161. The molding 101 contains the plurality of electrical ports 102. The NEG cable 103 attaches the plurality of electrical ports 102 to an external power source.

The molding 101 is a sacrificial structure. The molding 101 mounts on the vertical surface 161. The molding 101 is a hollow structure. The molding 101 contains the plurality of electrical ports 102. The molding 101 is formed with all apertures and form factors necessary to allow a plug 163 to insert into any port selected from the plurality of electrical ports 102. The molding 101 comprises a shell 111 and a faceplate 112. The shell 111 is further defined with an exterior surface 121, an inferior surface 122, an interior surface 123, and a superior surface 124.

The exterior surface 121 refers to a decorative surface that is formed by the shell 111. The interior surface 123 is the surface of the shell 111 that attaches to the vertical surface 161. The interior surface 123 is the surface of the shell 111 that is distal from the exterior surface 121.

The inferior surface 122 is the surface of the shell 111 with the lowest elevation relative to the supporting surface of the vertical surface 161. The inferior surface 122 is positioned such that the plurality of electrical ports 102 are not visible when the molding 101 is viewed from a superior direction. The superior surface 124 is the surface of the shell 111 with the highest elevation relative to the supporting surface of the vertical surface 161. The superior surface 124 is the surface of the shell 111 that is distal from the inferior surface 122.

The shell 111 is a semi-rigid structure that forms the exterior boundary of the molding 101. The shell 111 is formed from a plastic material. The inferior surface 122 of the shell 111 is an open surface that provides access into the interior space of the shell 111. The faceplate 112 is a protective structure that installs in the inferior surface 122 of the shell 111. The faceplate 112 is formed with a plurality of apertures. The form factor of each of the plurality of apertures is geometrically similar to the form factor of the port face 131 of each electrical port selected from the plurality of electrical ports 102. Each selected electrical port mounts into the faceplate 112 such that the port face 131 of each selected electrical port is accessible from the exterior of the molding 101. Methods to form a faceplate 112 as described in this disclosure are well-known and documented in the electrical arts.

Each of the plurality of electrical ports 102 is an electrical power distribution port. Each electrical port selected from the plurality of electrical ports 102 distributes electrical power received from an external power source. This disclosure assumes that the external power source is the national electric grid 162. The national electric grid 162 is defined in greater detail elsewhere in the disclosure. Each electrical port selected from the plurality of electrical ports 102 is identical. Each electrical port selected from the plurality of electrical ports 102 transfers electrical power from the national electric grid 162 to a plug 163 that inserts into the selected electrical port. Each of the plurality of electrical ports 102 is configured for use with the plug 163. The plug 163 is defined in greater detail elsewhere in this disclosure.

Each electrical port selected from the plurality of electrical ports 102 mounts in the molding 101 such that each selected electrical port is accessible to the plug 163. The plug 163 transmits the electrical power drawn from the selected electrical port to an electrically powered device. In the first potential embodiment of the disclosure, each electrical port selected from the plurality of electrical ports 102 is a NEMA 5-15 electrical socket. Each electrical port selected from the plurality of electrical ports 102 is configured to receive a plug 163 selected from the group consisting of a NEMA 1-15P electrical plug and a NEMA 5-15P electrical plug.

Each electrical port selected from the plurality of electrical ports 102 comprises a port face 131. The port face 131 is the surface of any selected electrical port that receives the plug 163.

The NEG cable 103 is an electrical cable that attaches the plurality of electrical ports 102 to the national electric grid 162. The NEG cable 103 projects away from the interior surface 123 of the molding 101 and passes through the vertical surface 161 the molding 101 attaches to. The NEG cable 103 attaches to the national electric grid 162 within the interior of the surface formed by the vertical surface 161. In the first potential embodiment of the disclosure, the applicant prefers that the NEG cable 103 be a commercially available cable selected from the group consisting of 14/3 AWG cable or a 12/3 AWG cable.

The following definitions were used in this disclosure:

AWG: As used in this disclosure, AWG is an acronym for American Wire Gauge. The AWG is a standardized measure of the diameter of a cylindrically shaped electrically conductive wire. The AWG will vary by the metallic element that forms the electrically conductive wire. The unit of the AWG is the gauge. The gauge of an electrically conductive wire will decrease as the diameter of the electrically conductive wire increases. Within this disclosure, a 14 gauge electrically conductive wire is designated as 14 AWG. A cable comprising three 14 AWG electrically conductive wires is designated as 14/3 AWG. Tables specifying AWG gauges sizes are publically available.

Cable: As used in this disclosure, a cable is a collection of insulated wires covered by a protective casing used for transmitting electricity or telecommunication signals.

Ceiling: As used in this disclosure a ceiling refers to either: 1) the superior horizontal surface of a room that is distal from the floor; 2) the superior horizontal surface of a structure; or, 3) the upper limit of a range. A floor and a ceiling can refer to the same structure wherein the selection depends solely on the point of view of the user. The selection of this definition depends on the context. In situations where the context is unclear the first definition should be used.

Copolymer: As used in this disclosure, a copolymer is a polymer formed from two or more repeating molecules (also referred to as monomers).

Correspond: As used in this disclosure, the term correspond is used as a comparison between two or more objects wherein one or more properties shared by the two or more objects match, agree, or align within acceptable manufacturing tolerances.

Decorative: As used in this disclosure, the term decorative is used to describe a design decision or feature that is made for aesthetic purposes and is not anticipated to materially affect the novelty of the innovation described in this disclosure.

Elevation: As used in this disclosure, elevation refers to the span of the distance in the superior direction between a specified horizontal surface and a reference horizontal surface.

Exterior: As used in this disclosure, the exterior is used as a relational term that implies that an object is not contained within the boundary of a structure or a space.

External Power Source: As used in this disclosure, an external power source is a source of the energy that is externally provided to enable the operation of the present disclosure. Examples of external power sources include, but are not limited to, electrical power sources and compressed air sources.

Faceplate: As used in this disclosure, a faceplate is a plate structure that mounts on a surface to enclose a potentially dangerous electrical or mechanical structure. A faceplate is often formed with apertures that allow for access to interface components of the electrical or mechanical structure. Commonly used faceplates with such apertures include, but are not limited to, a faceplate that encloses an electrical port used for power distribution and a faceplate that encloses an electrical switch used for turning on or off a light.

Floor: As used in this disclosure a floor refers to either: 1) the inferior horizontal surface of a room upon which one stands; 2) the inferior horizontal surface of a structure; 3) a bottom or base; or, 4) the lower limit of a range. The selection of the definition depends on the context. In situations where the context is unclear the third definition should be used.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. Always use Correspond and One to One Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Housing: As used in this disclosure, a housing is a rigid casing that encloses and protects one or more devices.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Molding: As used in this disclosure, a molding is a horizontally oriented strip structure that is attached to a vertical surface such as a wall. The molding extends away from the wall by a distance. The molding is a sacrificial structure that prevents furniture and other objects from damaging the vertical surface. Specifically, the molding is positioned such that items will hit the molding before hitting a wall thereby damaging the molding instead of the wall. A ceiling molding mounts at the intersection of the vertical surface and the ceiling. A floor molding mounts at the intersection of a vertical surface and a floor has several other common names including a base molding, and a cove base. A dabo molding mounts on a vertical surface between twenty-four inches and forty inches from the floor has several common names including a rail molding, a furniture molding, and a chair molding. Picture molding mounts on a vertical surface that is between the ceiling and 60 inches from the floor.

Monomer: As used in this disclosure, a monomer refers to a molecular structure that bonds to itself in a repeating manner to form a polymer.

National Electric Grid: As used in this disclosure, the national electric grid is a synchronized and highly interconnected electrical network that distributes energy in the form of electric power from a plurality of generating stations to consumers of electricity.

NEMA: As used in this disclosure, NEMA is an acronym for National Electric Manufacturers Association. NEMA is a manufacturer's association known for publishing widely accepted technical standards regarding the performance of electrical power distribution equipment.

NEMA 5-15 Electrical Socket: As used in this disclosure, the NEMA 5-15 electrical socket is a port designed to provide electric power drawn from the National Electric Grid. The NEMA 5-15 electrical socket is commonly used to deliver electrical power to electric devices in residential, office, and light industrial settings. The typical NEMAS-15 electrical socket comprises a plurality of electric ports from which electric power is drawn. The position of each of the plurality of electric ports is placed in a standardized position. The typical NEMAS-15 electrical socket further comprises a plate hole which is a standardized hole located in a standardized position within the NEMA 5-15 electrical socket that that is designed to receive a bolt that is used to attach a faceplate to the NEMA 5-15 electrical socket. The NEMA 5-15 electrical socket is also commonly referred to as an electrical outlet.

NEMA 1-15P Electrical Plug: As used in this disclosure, the NEMA 1-15P Electrical Plug is a plug that is designed to insert into a NEMA 5-15 Electrical Socket to deliver electrical power to an electrical device. The NEMA 1-15P Electrical Plug is a two blade plug that is commonly found in residential and office environments within the United States.

NEMA 5-15P Electrical Plug: As used in this disclosure, the NEMA 5-15P Electrical Plug is a plug that is designed to insert into a NEMA 5-15 Electrical Socket to deliver electrical power to electrical devices. The NEMA 5-15P Electrical Plug is a three blade plug that is commonly found in residential and office environments within the United States.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Organic: As used in this disclosure, organic refers to a carbon-based chemical structure. A limited number of carbon-based salts are traditionally considered inorganic chemical structures and are excluded from the study of organic chemistry.

Outlet: As used in this disclosure, an outlet is a device placed in the electrical wiring system of a building where electrical current can be taken to run electrical devices. In this disclosure, an outlet is a socket adapted to receive a plug.

Plastic: As used in this disclosure, plastic refers to a manufactured material formed from a structure selected from the group consisting of a polymer or a copolymer. Unless stated otherwise, this disclosure assumes that the plastic is formed from organic monomers.

Plug: As used in this disclosure, a plug is an electrical termination that electrically connects a first electrical circuit to a second electrical circuit or a source of electricity. As used in this disclosure, a plug will have two or three metal pins.

Polymer: As used in this disclosure, a polymer refers to a molecular chain that comprises multiple repeating units known as monomers. The repeating unit may be an atom or a molecular structure.

Port: As used in this disclosure, a port is an electrical termination that is used to connect a first electrical circuit to a second external electrical circuit. In this disclosure, the port is designed to receive a plug.

Sacrificial Structure: As used in this disclosure, a sacrificial structure is a first object or structure that protects a second object or structure from damage. More specifically, the sacrificial structure protects the second object or structure by being damaged instead of the second object or structure.

Semi-Rigid Structure: As used in this disclosure, a semi-rigid structure is a solid structure that is stiff but not wholly inflexible and that will deform under force before breaking.

A semi-rigid structure may or may not behave with an elastic nature in that a semi-rigid structure need not return to its relaxed shape.

Shell: As used in this disclosure, a shell is a structure that forms an outer covering intended to contain an object. Shells are often, but not necessarily, rigid or semi-rigid structures that are intended to protect the object contained within it.

Socket: As used in this disclosure, a socket is an electrical device that 1) forms an opening or a cavity that acts as a receptacle for an inserted object; and, 2) is designed to receive or transfer electricity to or from the object inserted in the socket.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A power distribution structure comprising:
   a molding, a plurality of electrical ports, and a national electric grid cable (hereinafter NEG cable);
   wherein the molding is configured to attach to a vertical surface;
   wherein the molding contains the plurality of electrical ports;
   wherein the power distribution structure is configured for use with the vertical surface;
   wherein the power distribution structure mounts on the vertical surface;
   wherein the power distribution structure is configured for use with an external power structure;
   wherein the NEG cable attaches the plurality of electrical ports to the external power structure;
   wherein the molding is a sacrificial structure;
   wherein the molding is a hollow structure;
   wherein the molding comprises a shell and a faceplate;
   wherein the faceplate attaches to the shell;
   wherein the shell is further defined with an exterior surface, an inferior surface, an interior surface, and a superior surface;
   wherein the interior surface is opposite the exterior surface;
   wherein the interior surface is adjacent the inferior surface;
   wherein the exterior surface is adjacent the superior surface;
   wherein the interior surface is configured to attach to the vertical surface;
   wherein the shell is a semi-rigid structure;
   wherein the inferior surface of the shell is an open surface;
   wherein the faceplate is a protective structure;
   wherein the faceplate installs in the inferior surface of the shell.

2. The power distribution structure according to claim 1 wherein each electrical port selected from the plurality of electrical ports mounts into the faceplate such that each selected electrical port is accessible from the exterior of the molding.

3. The power distribution structure according to claim 2
   wherein each of the plurality of electrical ports is an electrical power distribution port;
   wherein each electrical port selected from the plurality of electrical ports distributes electrical power received from the external power source.

4. The power distribution structure according to claim 3 wherein each electrical port selected from the plurality of electrical ports is identical.

5. The power distribution structure according to claim 4 wherein each of the plurality of electrical ports is configured for use with a plug;
   wherein each electrical port selected from the plurality of electrical ports transfers electrical power from the external power source to the plug;
   wherein each electrical port selected from the plurality of electrical ports mounts in the molding such that each selected electrical port is accessible to the plug;
   wherein the plug inserts into the selected electrical port.

6. The power distribution structure according to claim 5 wherein the plug transmits the electrical power drawn from the selected electrical port to an electrically powered device.

7. The power distribution structure according to claim 6
   wherein each electrical port selected from the plurality of electrical ports comprises a port face;
   wherein the port face is the surface of the selected electrical port that receives the plug.

8. The power distribution structure according to claim 7
   wherein the faceplate is formed with a plurality of apertures;
   wherein the form factor of each of the plurality of apertures is geometrically similar to the form factor of the port face of each electrical port selected from the plurality of electrical ports.

9. The power distribution structure according to claim 8 wherein each electrical port selected from the plurality of electrical ports mounts into the faceplate such that the port face of each selected electrical port is accessible from the exterior of the molding.

10. The power distribution structure according to claim 9
    wherein the NEG cable is an electrical cable;
    wherein the NEG cable attaches the plurality of electrical ports to the national electric grid;

wherein the NEG cable projects away from the interior surface of the molding and passes through the vertical surface the molding attaches to;

wherein the NEG cable attaches to the national electric grid within the interior of the surface formed by the vertical surface.

11. The power distribution structure according to claim 10 wherein each electrical port selected from the plurality of electrical ports is a NEMA 5-15 electrical socket;

wherein each electrical port selected from the plurality of electrical ports is configured to receive a plug selected from the group consisting of a NEMASP electrical plug and a NEMA 5-15P electrical plug.

12. The power distribution structure according to claim 11 wherein the NEG cable is selected from the group consisting of 12/3 AWG cable or a 14/3 AWG cable.

13. The power distribution structure according to claim 12 wherein the external power source is the national electric grid.

14. The power distribution structure according to claim 13 wherein the molding is a dabo molding;

wherein the shell is formed from a plastic material.

* * * * *